US00RE35319E

United States Patent [19]

Yamada et al.

[11] E Patent Number: Re. 35,319

[45] Reissued Date of Patent: Aug. 27, 1996

[54] PRINTER ACCOMMODATING TWO TYPES OF PRINTING SHEETS

[75] Inventors: Masahiko Yamada; Yoshikazu Ito; Naoki Asai, all of Nagano, Japan

[73] Assignee: Seiko Epson Corporation, Tokyo, Japan

[21] Appl. No.: 316,469

[22] Filed: Oct. 3, 1994

Related U.S. Patent Documents

Reissue of:

[64] Patent No.: 5,152,623
Issued: Oct. 6, 1992
Appl. No.: 610,661
Filed: Nov. 8, 1990

[30] Foreign Application Priority Data

Nov. 9, 1989 [JP] Japan ..... 1-292054

[51] Int. Cl.[6] ..... B41J 15/20

[52] U.S. Cl. ..... 400/605; 400/54; 400/606; 400/642

[58] Field of Search ..... 400/54, 605, 606, 400/607, 607.2, 642, 690.4

[56] References Cited

U.S. PATENT DOCUMENTS

| | | | |
|---|---|---|---|
| 3,625,333 | 12/1971 | Cortona | 400/603 |
| 4,340,315 | 7/1982 | Teichmann et al. | 400/690.4 |
| 4,360,279 | 11/1982 | Sugiura | 400/600.2 |
| 4,572,418 | 2/1986 | Hirata | 400/54 |
| 4,725,857 | 2/1988 | Piatt et al. | 400/605 |
| 4,787,764 | 11/1988 | Ikeda et al. | 400/616.2 |
| 4,847,633 | 7/1989 | Piatt et al. | 400/605 |
| 4,995,745 | 2/1991 | Yokoi et al. | 400/605 |

FOREIGN PATENT DOCUMENTS

| | | | |
|---|---|---|---|
| 0258026 | 3/1988 | European Pat. Off. | 400/605 |
| 56-150583 | 11/1981 | Japan . | |
| 59-124881 | 7/1984 | Japan . | |
| 0190877 | 10/1984 | Japan | 400/605 |
| 0097871 | 5/1987 | Japan | 400/605 |
| 2202209 | 9/1988 | United Kingdom . | |

*Primary Examiner*—Stephen Funk
*Attorney, Agent, or Firm*—Sughrue, Mion, Zinn, Macpeak & Seas

[57] ABSTRACT

A printer which can accommodate both continuous sheets and cut sheets includes both a continuous sheet path and a cut sheet path. A printing section is provided in common for the continuous and cut sheets. A manually [slidable] *movable* continuous sheet guide plate is provided in the upper portion of the printing section. A detector detects [operatin] *operation* of the continuous sheet guide plate. When the guide plate is [slid] *moved* so that the cut sheet path is closed and the continuous sheet path is selected, in response to the output of the detector the continuous sheet is fed to the exit of the continuous sheet path.

7 Claims, 3 Drawing Sheets

PRINTER ACCOMMODATING TWO TYPES OF PRINTING SHEETS

Matter enclosed in heavy brackets [ ] appears in the original patent but forms no part of this reissue specification; matter printed in italics indicates the additions made by reissue.

BACKGROUND OF THE INVENTION

The present invention relates to a printer apparatus capable of printing on a least two different types of recording sheets, namely, slip sheets, such as cut sheets, and roll sheets, such as journal paper or receipts.

To guide a roll sheet through the roll sheet path, a conventional printer requires a selector for selecting the proper paper path, that is, the cut sheet path, slip sheet path or roll sheet path, and a drive source for driving the guide plate. To feed a roll sheet through the printer, a feed switch is operated, which is used for feeding another sheet in synchronism with the operation of the guide plate for selecting either the slip sheet path or the roll sheet path.

In the prior art arrangement, the printer must be provided with a separate drive source for driving the guide plate, making the printer mechanism complicated. In addition, the printer frequently encounters situations where the paper must be fed in synchronism with the operation of the feed switch. This requires a complicated control mechanism.

SUMMARY OF THE INVENTION

Accordingly, an object of the present invention is to provide a mechanism for a printer in which a slip sheet path or a roll sheet path is selected only through the operation of a roll sheet guide plate upon the selection of the roll sheet feed path, and a roll sheet can be readily set upon the selection of the roll sheet feed path, providing improved operability of the printer. It is a further object of the invention to provide a control system for the printer mechanism.

To achieve the above object, a printer is provided having a mechanism which can accommodate both a first recording sheet (a continuous sheet) and a second recording sheet (a cut sheet), the mechanism comprising: a first recording sheet path for conveying therethrough the first recording sheet; a second recording sheet path for conveying therethrough the second recording sheet; a printing section common to the first and second recording sheets; a roll sheet guide plate disposed in the upper portion of the printing section and manually [slidable] *movable* and a detector for detecting an operation of the roll sheet guide plate, wherein by manually [sliding] *moving* the roll sheet guide plate, the second recording sheet path is closed and the first recording sheet path is opened, and an operation of the roll sheet guide plate is detected by the detector.

According to another aspect of the invention, a control system is disclosed comprising a printer having the mechanism as described above, and further comprising a recording sheet control means for controlling the feed of the recording sheet, whereby the recording sheet control means is controlled according to the output of the detector, and the first recording sheet is guided to an exit of the appropriate recording sheet path.

In accordance with the above-described arrangements, when a roll sheet is fed to the printer, the slip sheet path is closed by moving the guide plate. At the same time, the drive means for controlling the paper feed is driven. Then, the roll sheet is placed to be ready for paper to be fed. Accordingly, the roll sheet can readily be set by merely inserting and pushing the roll sheet up to a roll sheet feed means. The control system for the printer of the present invention is excellent in operability.

Other objects, advantages, and features of the present invention will become apparent while reading the following detailed description in conjunction with the accompanying drawings.

DESCRIPTION OF THE PREFERRED EMBODIMENTS

Preferred embodiments of the present invention will be described with reference to the accompanying drawings.

Figure 1:
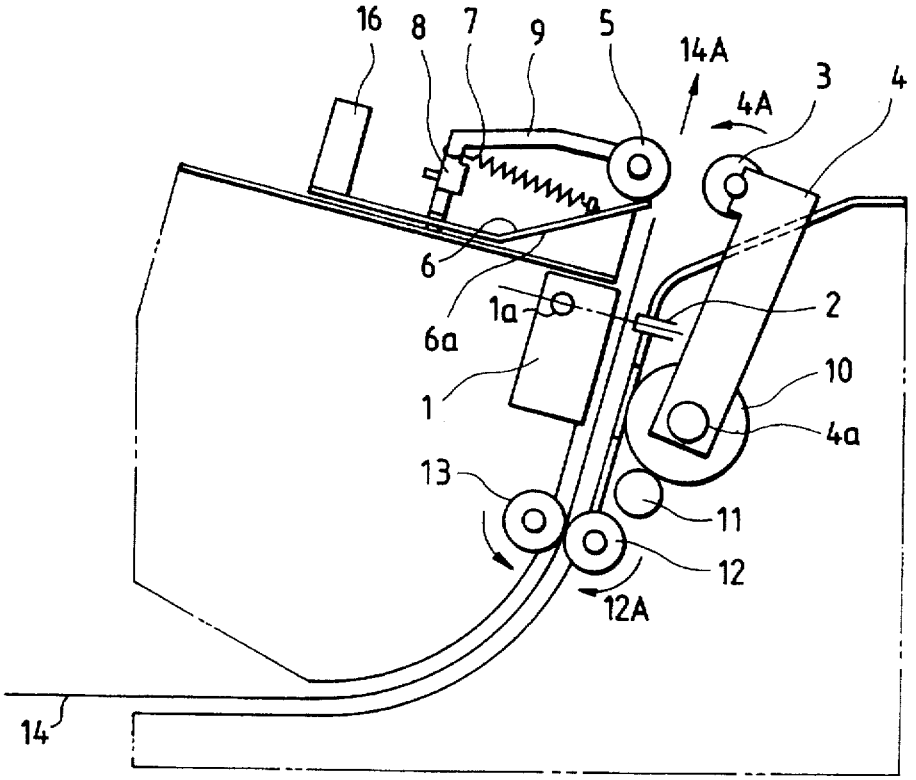
FIG. 1 is a side view showing a mechanism of a paper guide portion of a printer according to a preferred embodiment of the present invention, the mechanism printing a slip sheet.
Figure 2:
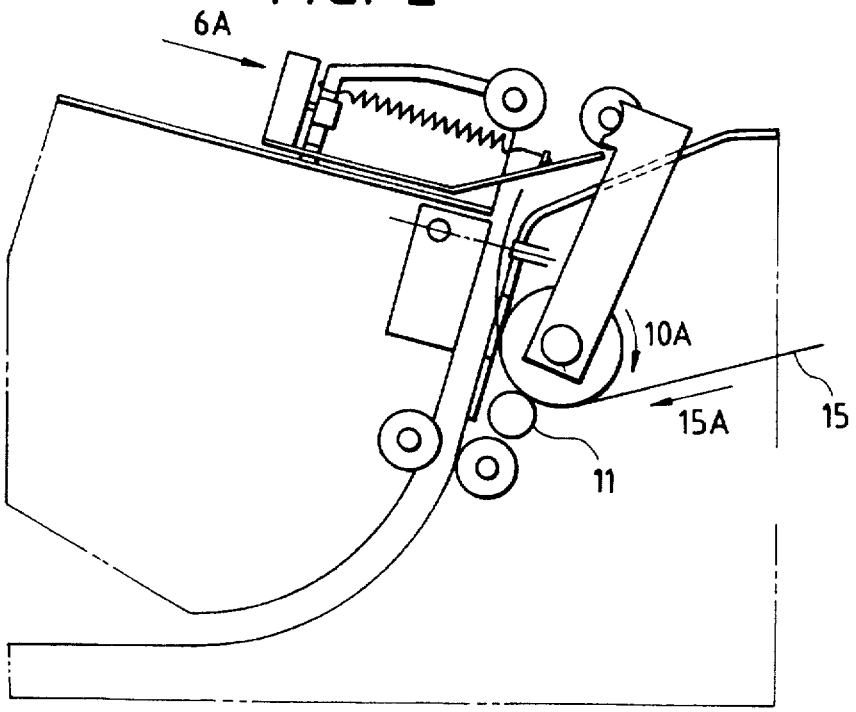
FIG. 2 is a side view showing the printer mechanism being placed in a sate where a roll guide plate is [slid] *moved* and a roll sheet is guided into the mechanism.
Figure 3:
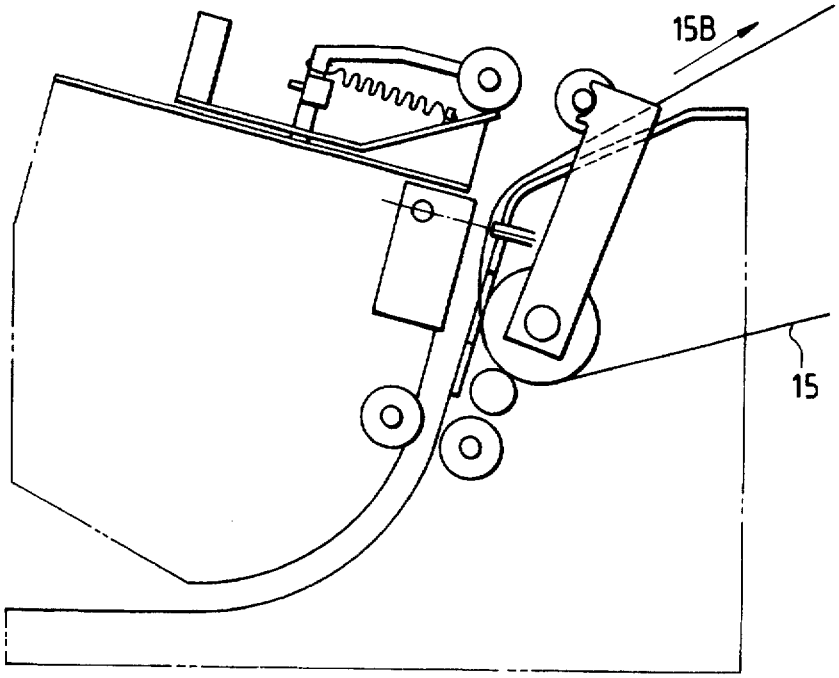
FIG. 3 is a side view showing the printer mechanism in a state where the roll sheet has been set in the mechanism.
Figure 4:
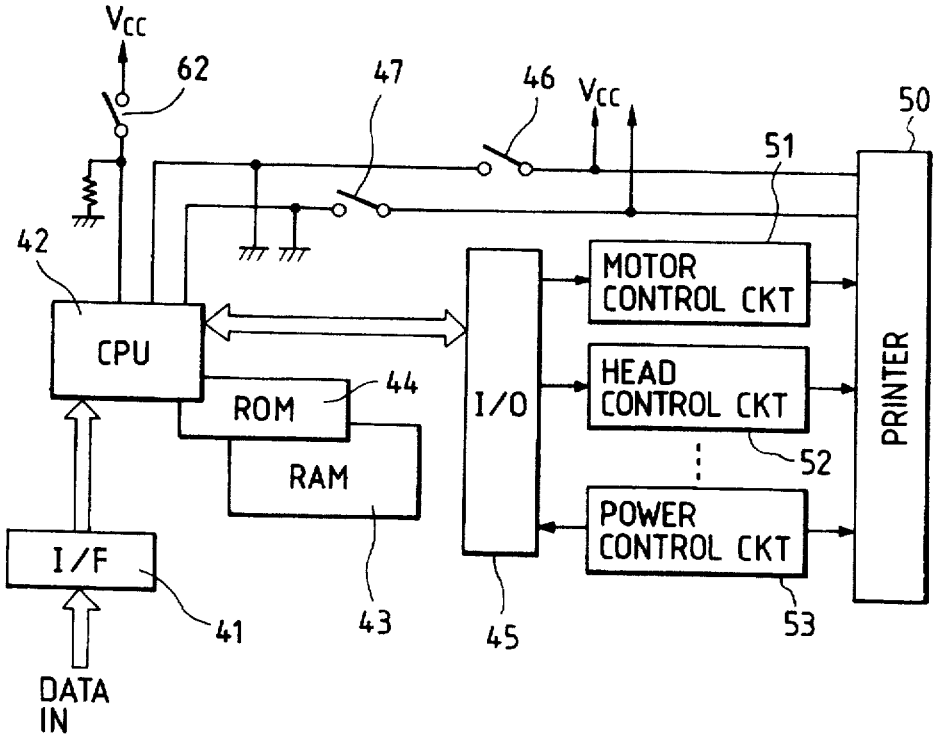
FIG. 4 is a block diagram showing a control system for the printer according to the present invention.
Figure 5:
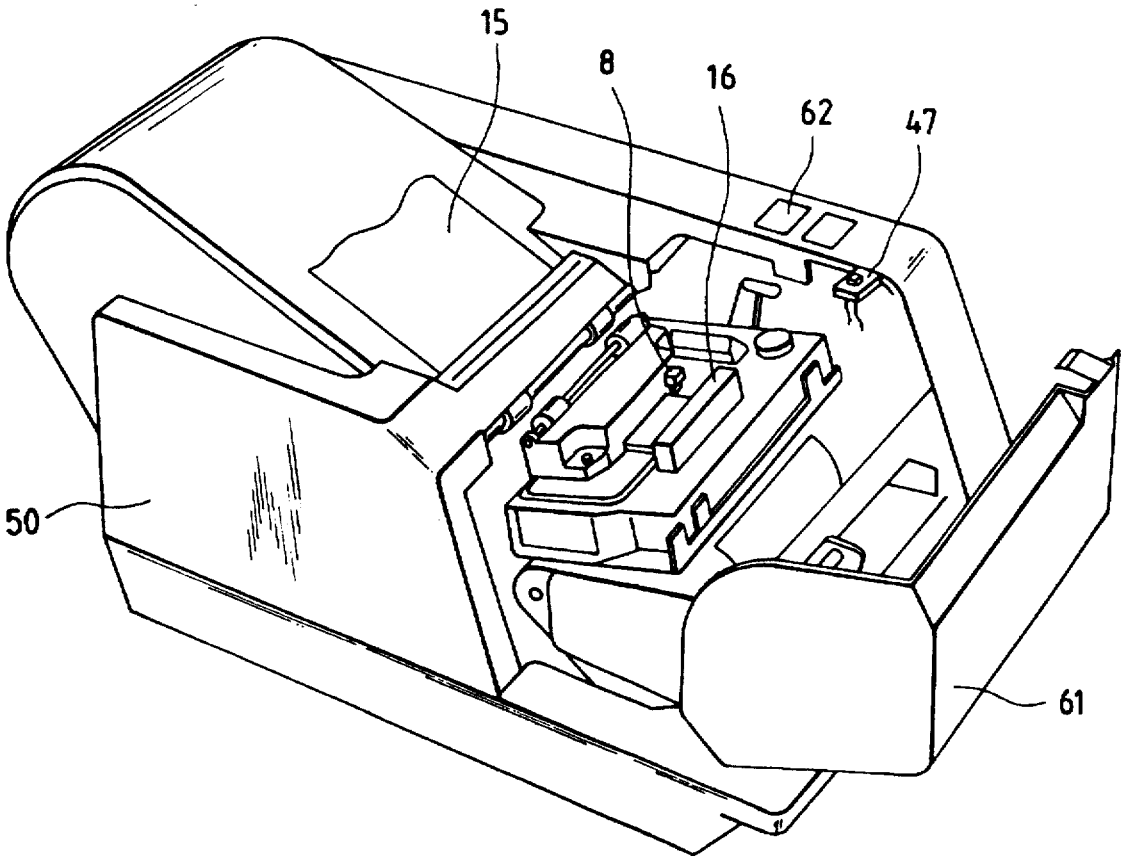
FIG. 5 is a perspective view showing a printer incorporating the printer mechanism of the present invention.

FIG. 1 is a side view showing a mechanism of a paper guide portion of a printer according to one embodiment of the present invention, where the mechanism is printing a slip sheet as a cut sheet. FIG. 2 is a side view showing the printer mechanism being placed in a status where a roll guide plate is [slid] *moved* and a roll sheet is guided into the mechanism. FIG. 3 is a side view showing the printer mechanism in a state where the roll sheet has been guided through the mechanism. FIG. 4 is a block diagram showing a control system for the printer according to the present invention. FIG. 5 is a perspective view showing a printer incorporating the printer mechanism of the present invention.

In FIG. 1, a print head 1 is disposed facing a platen 2. Print data can be printed on a slip sheet 14 and a roll paper 15 (a type of sheet–see FIG. 3) at a print position 1a where a print wire pin is located. The roll sheet guide plate 6 is held in a wait position by a return spring 7, which is strained between the plate 6 and a roll sheet guide mounting frame 9.

The slip sheet 14 passes the print position 1a (in the direction of arrow 14A) with the aid of a slip sheet feeding roller 12 (rotating in the direction of arrow 12A) and a slip sheet holding roller 13, which is held in press contact with the roller 12 by a spring force (not shown). As the slip sheet passes the print position 1a, print data is printed on the slip sheet by the print head 1.

When the slip sheet is fed into the printer's slip sheet path a predetermined distance, a slip sheet pull-out roller 3 swings in the direction of arrow 4A about a fulcrum shaft 4a about which a lever 4 is swingable, and presses the slip sheet against a slip sheet pull-out/holding roller 5. As the slip sheet travels along the slip sheet path, it is eventually discharged in the direction 14A after being subjected to the printing, with the assistance of the combination of rollers 3 and 5.

When the slip sheet path is selected, the roll sheet guide plate 6 is held in a wait position by the return spring 7 coupled between the guide plate and the frame 9, and therefore is out of the slip sheet path. This completely eliminates paper from jamming which is one of the most serious problems of a conventional printer.

The setting and exchange of the roll sheet 15 will be described with reference to FIGS. 1, 2 and 3.

The printer mechanism shown in FIG. 2 is ready for the setting of a new sheet. As shown, in this state the holding roller 13 is separated from the feeding roller 12, and the holding roller 5 likewise is separated from the feeding roller 3. One end of the roll sheet guide plate 6 is fixedly coupled with a knob 16, while the other end faces the slip sheet path. When the knob 16 is pushed in the direction of arrow 6A, the guide plate 6 closes the slip sheet path which extends between the pair of rollers 3 and 5. The movement of the knob 16 is detected by a detector 8 which is mounted on the frame 9. A signal derived from the detector 8 is used for driving a paper feeding power source (not shown). A drive force derived from the power source rotates a roll sheet feeding roller 10 in the direction of arrow 10A. The feeding roller 10 and a sheet holding roller 11 nip the leading edge of a roll sheet 15 as it is inserted in the direction 15A, and feeds the roll sheet in the same direction 15A. The roll sheet 15 passes the print position 1a, advances along a slope 6a of the guide plate 6, and exits the mechanism in the direction of arrow 15B. The roll sheet 15 exiting from the mechanism is subsequently fed to a cutter or a take-up unit, for instance. A recording sheet (e.g., recording sheets 14, 15) conveyance mechanism includes rollers 3, 5, and 10–13).

After the roll sheet 15 is fed a predetermined distance, the knob 16 is released. Then, the return spring 7, which is coupled to the frame 9, returns the guide plate 6 to the wait position. At this time, the knob 16 disengages from the detector 8, which in turn produces a signal. In response to the signal, the setting of the roll sheet feed path is stopped and completed. It is noted that even when the roll sheet is in a position as shown in FIG. 3, data can be printed on the slip sheet, and if the roll sheet paper is pressure sensitive, the same data can also be printed on the roll sheet paper.

FIG. 4 is a block diagram showing a control system for the printer according to the present invention. FIG. 5 is a perspective view showing a printer incorporating the printer mechanism of the present invention. As shown in FIG. 4, data is inputted to a CPU 42 from an external device through an interface 41. A ROM 44 is provided for storing program codes for CPU 42, character fonts data and so on. The data represents information, such as character fonts, and is used by the CPU to control and operate the printer. A RAM 43 temporarily stores the data from the interface 41 or the data derived from the ROM 44. An I/O 45 serves as a buffer for temporarily storing data, which is transferred to control circuits 51 to 53 for controlling a printer 50 which is under the control of the CPU 42. Of the control circuits 51 to 53, reference numeral 51 designates a motor control circuit, 52 represents a head control circuit, and 53 represents a power control circuit for operating the printer mechanism. A detector 46 detects the motion of the roll sheet guide plate. Another detector 47 detects when the cover of the printer is opened.

In FIG. 5, reference numeral 50 designates a printer case, and 61 represents a printer cover for covering the printing section, which cover is swingable between an open or closed position. A panel switch 62, coupled to the control system of the printer, instructs the control system to automatically feed a recording sheet. The cover open switch 47 is fixed at such a location as to be in contact with the cover of the printer case. Upon receipt of a signal from the switch, the CPU recognizes whether or not the cover is in the open or closed position. When the cover is in the closed position, if the knob 16 (shown in FIG. 1) is pushed in the direction 6A, it becomes in contact with the switch 8 fixed to the frame 9, and the switch 8 generates a signal accordingly. Upon receipt of this signal, the CPU drives a power source (not shown) through the I/O 45 and the motor control circuit 51 to feed paper into the printer. At this time, the roll sheet is fed and moved along the slope 6a of the guide plate 6 in the direction 15B (FIG. 3). Thus, the roll sheet is reliably advanced in the first recording sheet path.

When the cover is in the open position, if the panel switch is mistakenly pushed, the roll sheet may be transferred to the wrong paper path. This could cause the paper to jam. To avoid this, a control program operates when the cover is in the open position to render the panel switch inoperable.

As understood from the foregoing description, the printer mechanism of the invention contains the roll sheet guide, the switch for detecting the movement of the roll sheet guide plate, and the power control means driven by that switch. With this arrangement, the roll sheet path can be selected through only the operation of the guide plate, which is simple and not time consuming. Furthermore, the present invention includes the cover open detector. With the use of the detector, when the cover is in the open position, the panel switch is made inoperable, thereby preventing paper from jamming.

It should be understood that the present invention is not limited to the above-mentioned embodiments, but may be changed and modified within the scope and spirit of the appended claims.

What is claimed is:

1. A printer which can accommodate at least two kinds of recording sheets including both a first recording sheet as a continuous sheet and a second recording sheet as a cut sheet, comprising:

a first recording sheet path for passing therethrough said first recording sheet;

a second recording sheet path for passing therethrough said second recording sheet;

a recording sheet conveyance mechanism for individually or simultaneously conveying said first and second recording sheets;

a printing section Provided in common for said first and second recording sheets, said printing section individually or simultaneously holding said first and second recording sheets;

a continuous sheet guide plate provided in an upper portion of said printing section, said continuous sheet guide plate being manually [slidable] *movable* between a first, rest position and a second position;

spring means for exclusively urging said continuous sheet guide plate to said first position; and a detector for detecting an operational position of said continuous sheet guide plate;

wherein said first and second recording sheet paths are open to allow said first and second recording sheets to be covered therethrough when said continuous sheet guide plate is in said first position, said continuous sheet guide plate being [slidable] *movable* to said second position so that only said first recording sheet path is open and said second recording sheet path is closed, and wherein said detector detects the operation of said continuous sheet guide plate.

2. The printer according to claim 1, further comprising:

a printer case for enclosing at least said printer;

a cover for covering said printing section in said case, said cover being swingable between open and closed positions;

a panel switch for instructing automatic feeding of said first and second recording sheets;

a cover open detector for detecting when said cover is in the open position; and control means for rendering said panel switch inoperable when said cover is in the open position.

3. The printer according to claim 1, wherein said printer further comprises: a feeding roller, a holding roller, a pull-out roller, and a pull-out/holding roller, said holding roller being in pressing contact with said feeding roller, a slip sheet being held between said feeding roller and said holding roller, said feeding and holding rollers rotating in opposite directions to pass said slip sheet through printer along said second recording sheet path, said slip sheet after being fed a predetermined distance along said second recording path being held by said pull-out roller and said pull-out/holding roller, said pull-out and pull-out/holding rollers rotating in opposite directions to guide and pass said slip sheet out of said printer.

4. The printer according to claim 1, wherein said first recording sheet path and said second recording sheet path have common paths for a portion of their total paths.

5. The printer according to claim 1, further comprising: a frame and a return spring, said return spring being coupled between said guide plate and said frame, and holding said guide plate out of said second recording sheet path when said second recording sheet path is selected.

6. The printer according to claim 1, further comprising: a knob attached to one end of said guide plate, a feeding roller, and a sheet holding roller, wherein, by [sliding] *moving* said knob, said guide plate closes said second sheet path, opens said first recording sheet path, and causes said detector to generate a signal which causes said feeding roller to rotate.

7. A printer as claimed in claim 1, further comprising recording sheet control means for guiding said first recording sheet to an exit of said first recording sheet path in response to an output of said detector.

* * * * *